(12) United States Patent
Klauer et al.

(10) Patent No.: US 8,695,827 B2
(45) Date of Patent: Apr. 15, 2014

(54) DIESEL EXHAUST FLUID AND FUEL FILL SYSTEM

(75) Inventors: Aaron S Klauer, Asbury, IA (US); Nitin N Patil, Kolhapur (IN)

(73) Assignee: Deere & Company, Moline, IL (US)

( * ) Notice: Subject to any disclaimer, the term of this patent is extended or adjusted under 35 U.S.C. 154(b) by 44 days.

(21) Appl. No.: 13/460,933

(22) Filed: May 1, 2012

(65) Prior Publication Data
US 2013/0292386 A1     Nov. 7, 2013

(51) Int. Cl.
*B60K 15/03*     (2006.01)

(52) U.S. Cl.
USPC ........... 220/86.2; 180/314; 141/369; 141/370

(58) Field of Classification Search
USPC ................. 180/314; 141/369, 370; 220/86.2
See application file for complete search history.

(56) References Cited

U.S. PATENT DOCUMENTS

| 2,210,536 | A | * | 8/1940 | Hans ................................ 141/84 |
| 6,938,928 | B2 | * | 9/2005 | Pfohl et al. ..................... 280/831 |
| 7,549,694 | B2 | * | 6/2009 | Scott et al. ................. 296/97.22 |
| 7,866,357 | B2 | * | 1/2011 | Compere et al. .............. 141/321 |
| 8,167,009 | B2 | * | 5/2012 | Vandervoort et al. ......... 141/349 |
| 8,316,899 | B2 | * | 11/2012 | Lay et al. ....................... 141/286 |
| 2002/0170616 | A1 | * | 11/2002 | Channing ......................... 141/9 |
| 2009/0188923 | A1 | * | 7/2009 | Versaw et al. ................. 220/564 |
| 2011/0088791 | A1 | * | 4/2011 | Primm, Jr. ..................... 137/356 |
| 2011/0126514 | A1 | * | 6/2011 | Brammell ........................ 60/274 |
| 2011/0169243 | A1 | * | 7/2011 | Pfaff et al. ..................... 280/200 |
| 2013/0134175 | A1 | * | 5/2013 | O'Hara et al. ................. 220/827 |

* cited by examiner

*Primary Examiner* — Steven A. Reynolds
*Assistant Examiner* — Javier A Pagan (57) ABSTRACT

A system including a DEF tank and a fuel tank arranged in a portion of a vehicle to give that portion multiple structural functions. The system may be arranged to form a part of a counterweight on a work vehicle.

20 Claims, 12 Drawing Sheets

DIESEL EXHAUST FLUID AND FUEL FILL SYSTEM

FIELD OF THE INVENTION

The invention relates to locations for fuel tanks and diesel exhaust fluid (DEF) tanks on work vehicles as well as related fill locations. More specifically, it relates to a structure, system and method of increasing the reliability and convenience of fuel systems in work vehicles by efficiently locating the fuel and DEF tanks and conveniently locating and protecting their respective fill ports.

BACKGROUND OF THE INVENTION

On many work vehicles such as, for example, loaders, conventional fuel systems allow fuel tanks to be conveniently and securely located on the vehicle but frequently filler tubes for the tanks are not securely located. Further, in order to meet modern emissions requirements, many diesel powered work vehicles employ systems that may use additional fluids to treat engine exhaust to significantly reduce nitrogen oxide levels.

One such system is selective catalytic reduction (SCR) which includes dosing a reductant (generically, diesel exhaust fluid (DEF)) into engine exhaust prior to its exposure to a catalyst to reduce nitrogen oxide emissions by converting the nitrogen oxides to byproducts that are less toxic. The SCR requirement of dosing engine exhaust with DEF may require an additional tank aboard the vehicle for the storage of DEF. Such a tank may require special arrangements as DEF freezes at a relatively high temperature (approximately 12° F.) compared to diesel, expands significantly when frozen and may have corrosive effects upon contact with metal.

SUMMARY OF THE INVENTION

Disclosed is a DEF tank having a DEF tank filler tube in proximity to a fuel tank filler tube. Both DEF and fuel filler tubes may be located for ease of access as well as simultaneous access. The DEF tank filler tube may be located in proximity to the DEF tank to avoid DEF crystallization and freezing en route to the DEF tank. To optimize space use and access, both filler tubes may be located in a counterweight which may also be used as a step. DEF has corrosive effects. Thus, for the area in which the DEF filler tube is located, the invention may provide a protected, i.e., corrosive resistant spill guard to prevent the DEF from spilling over into unprotected areas of the work vehicle.

DESCRIPTION OF THE PREFERRED EMBODIMENT

Figure 1:
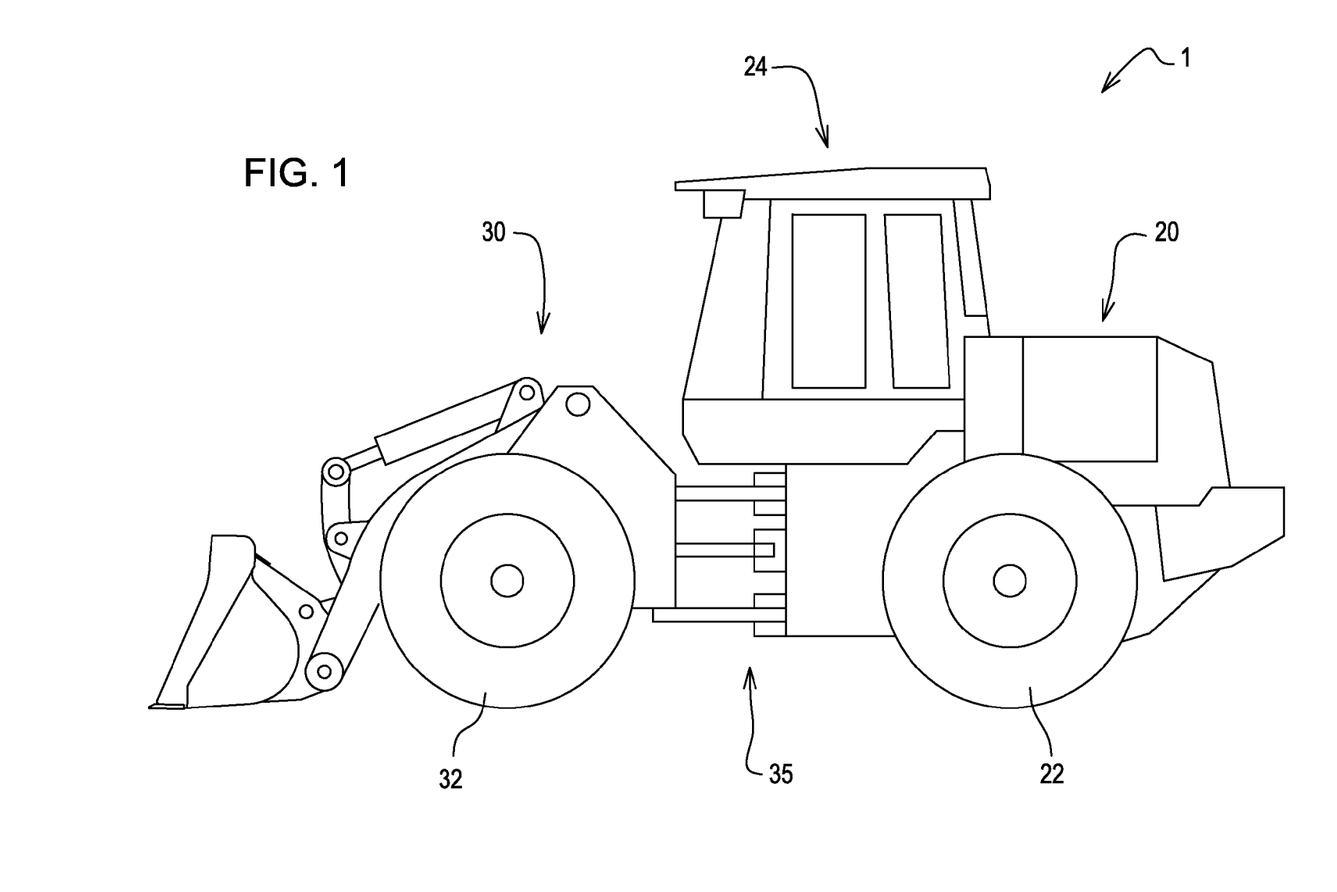
FIG. 1 shows a view of a work vehicle in which the invention may be used.

FIG. 1 illustrates a work vehicle 1 in which the invention may be used. The particular work vehicle illustrated in FIG. 1 is an articulated four wheel drive loader having a body which includes a rear body portion 20 pivotally connected to a front body portion 30 by vertical pivots 35. The loader 1 may be steered by pivoting of the front body portion 30 relative to the rear body portion 20 in a manner well known in the art. The rear and front body portions 20 and 30 are respectively supported on rear drive wheels 22 and front drive wheels 32. An operator's station 24 is provided on the rear body portion 20 and may be generally located above the vertical pivots 35. The rear and front drive wheels 22 and 32 may propel the vehicle along the ground and are powered in a manner well known in the art.

Figure 2:
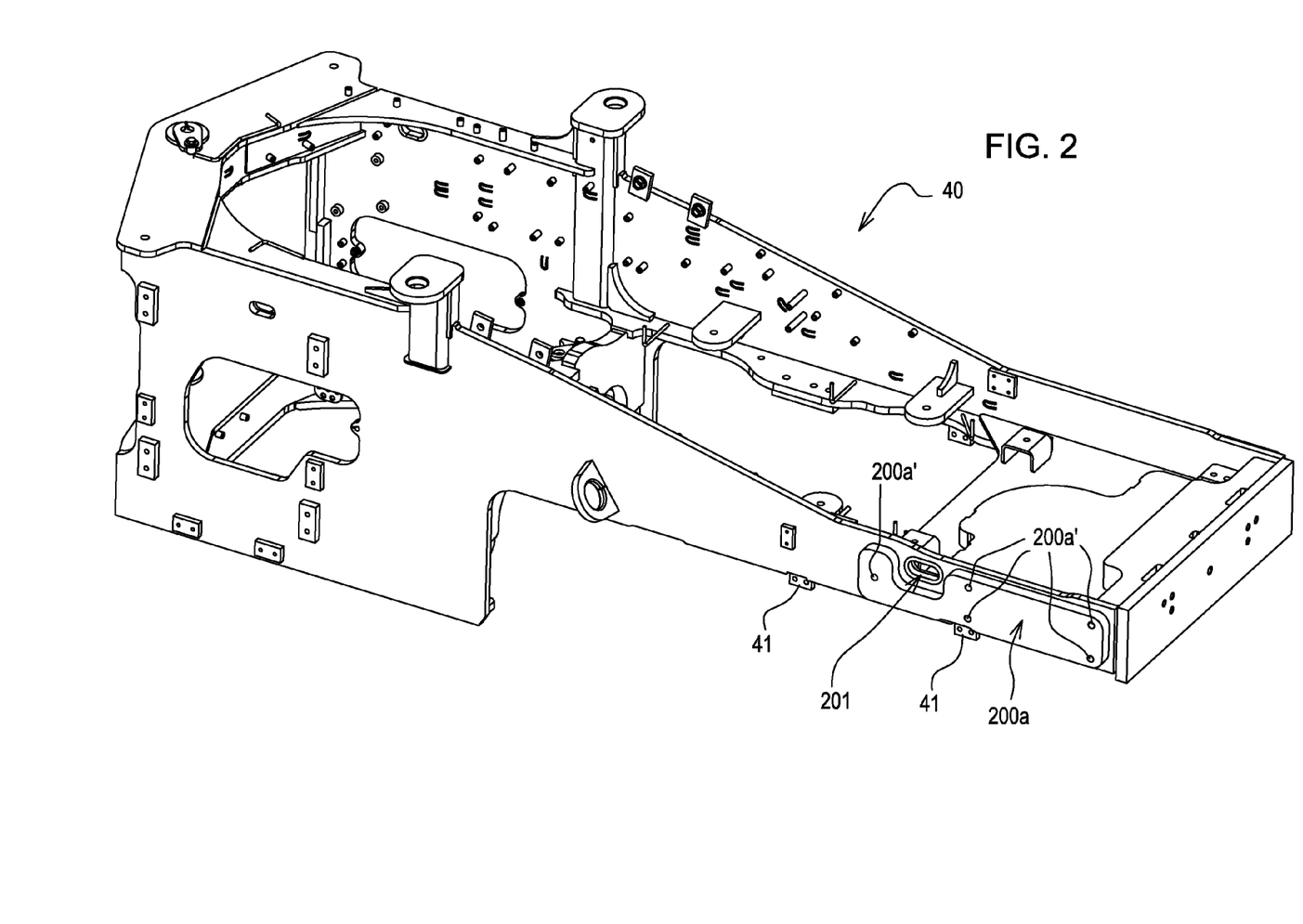
FIG. 2 illustrates an exemplary frame for a rear portion of the work vehicle of FIG. 1 to which the invention may be assembled.
Figure 3:
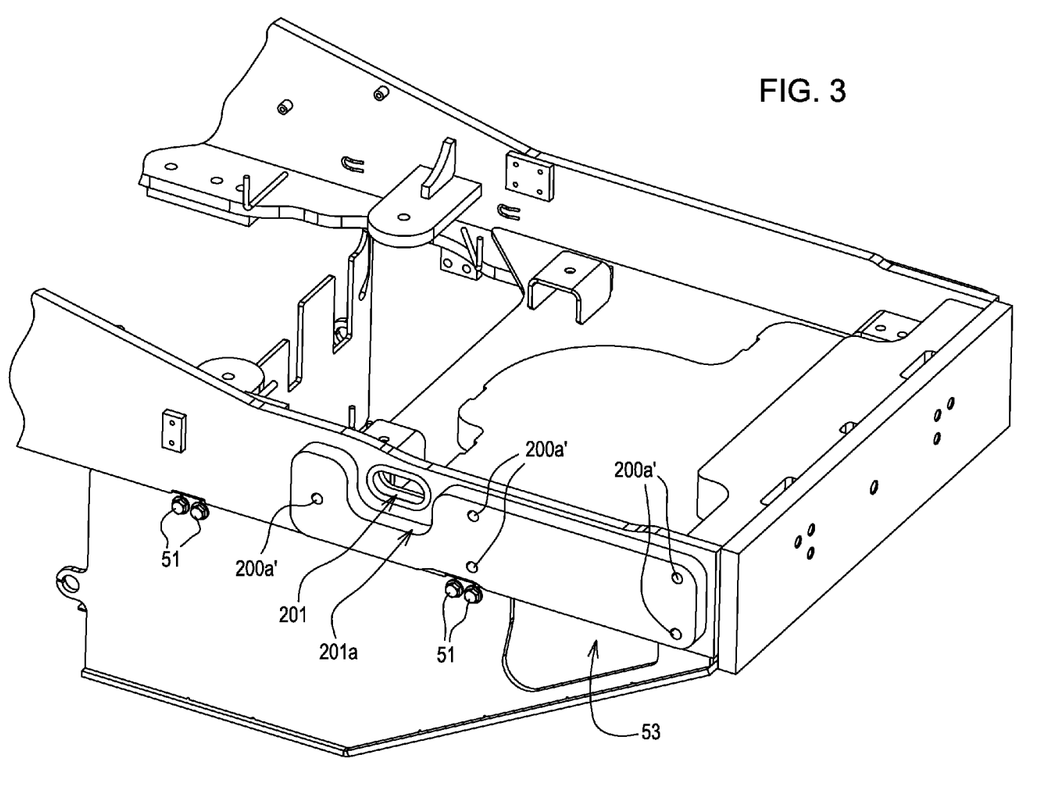
FIG. 3 illustrates a view of the frame of FIG. 2 with an exemplary embodiment of a fuel tank cradle attached.
Figure 4:
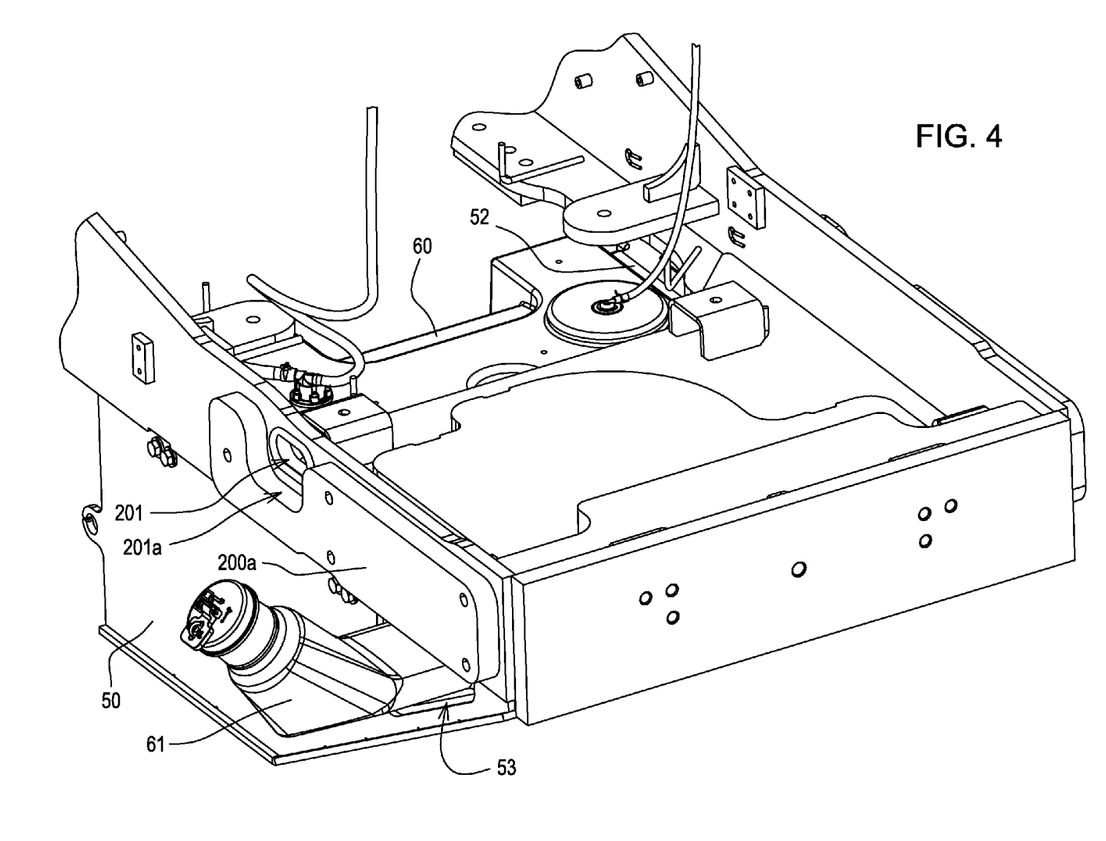
FIG. 4 illustrates a view of an exemplary fuel tank mounted to the fuel tank cradle.
Figure 5:
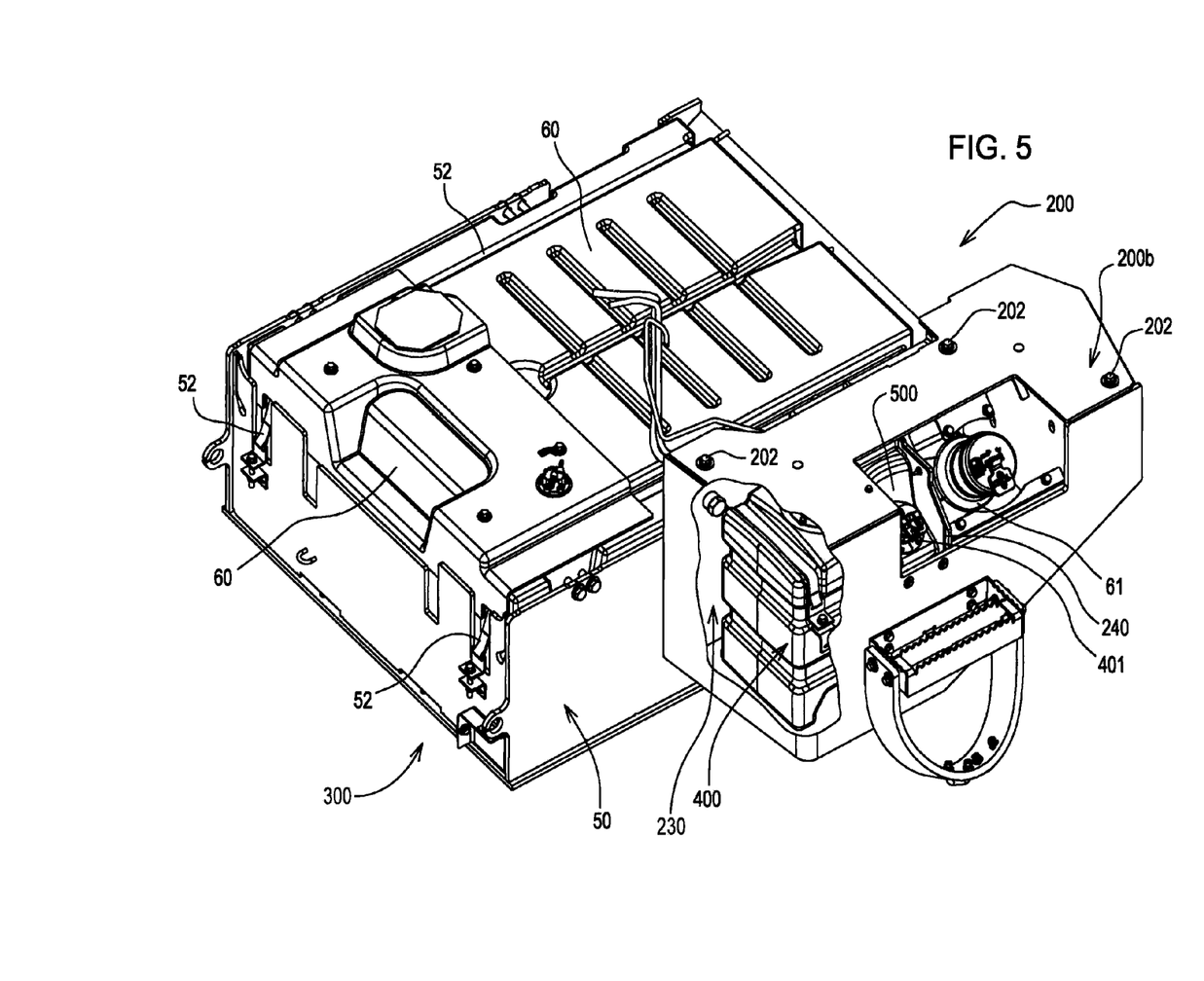
FIG. 5 illustrates a view of the cradle and fuel tank of FIG. 4 with an exemplary embodiment of a counterweight having a complementary fuel filler tube portion allowing the passage of the fuel filler tube, a complementary DEF tank portion supporting and protecting the DEF tank and allowing the passage of a DEF tank filler tube, and a wall separating the fuel filler tube from the DEF tank filler tube.

FIG. 2 illustrates a rear frame 40 for the articulated loader 1 of FIG. 1. Mounted on the rear frame 40 at mounting tabs 41 via screws 51 may be a cradle 50 for shielding and positioning a fuel tank 60 as illustrated in FIG. 3. As illustrated in FIGS. 4 and 5, the fuel tank 60 may be secured to the cradle 50 with hold down straps 52. As is apparent from FIG. 4, the fuel tank 60 and the cradle 50 may complement each other as the inner contours of the cradle 50 may conform to the outer portions of the fuel tank 60. Additionally, the cradle 50 may include an opening 53 allowing the fuel filler tube 61 to pass through the cradle 50.

Figure 6:
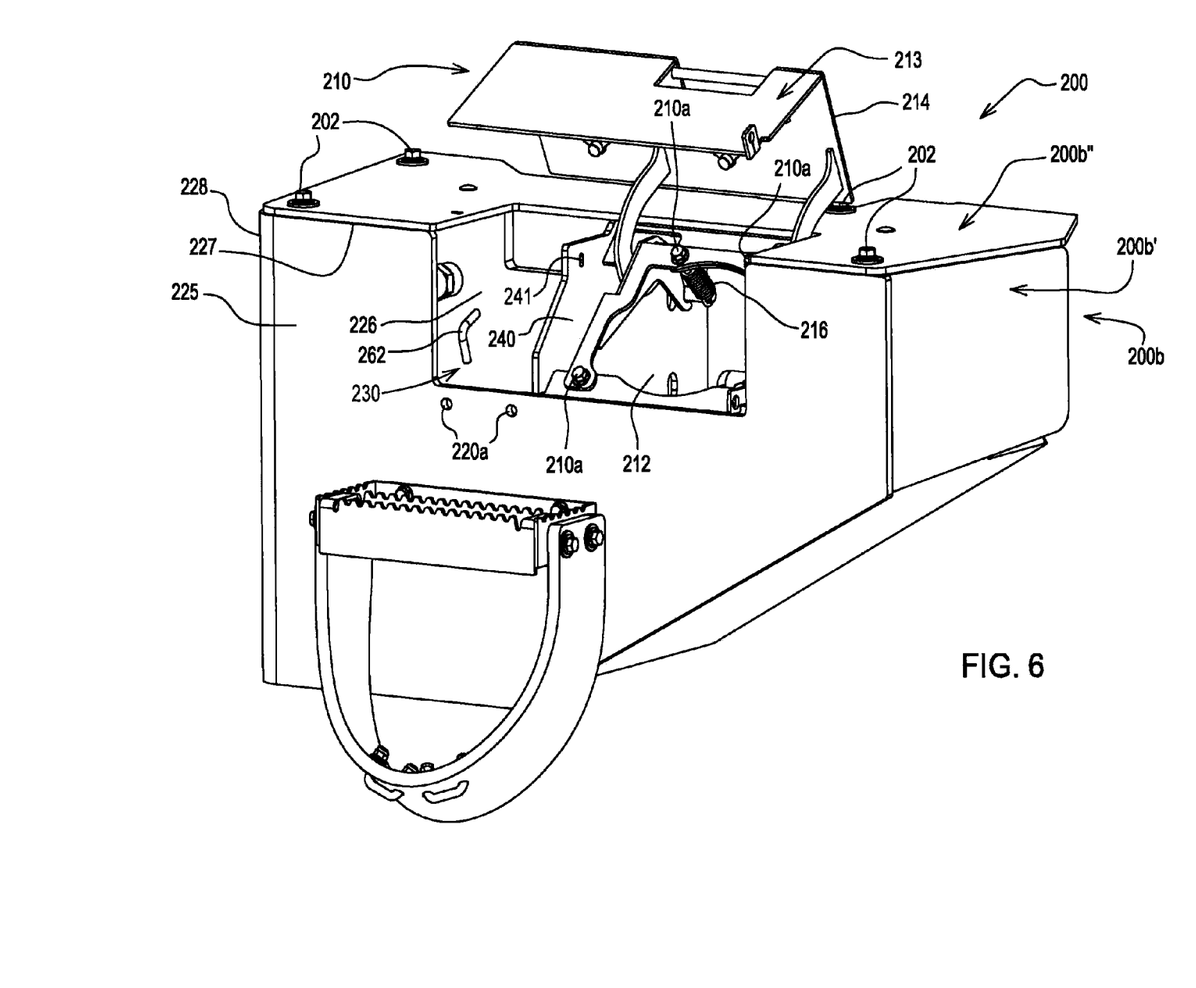
FIG. 6 illustrates the counterweight of FIG. 5 with a hinged door in addition to the complementary portions allowing passage of the fuel and DEF tank filler tubes.
Figure 7:
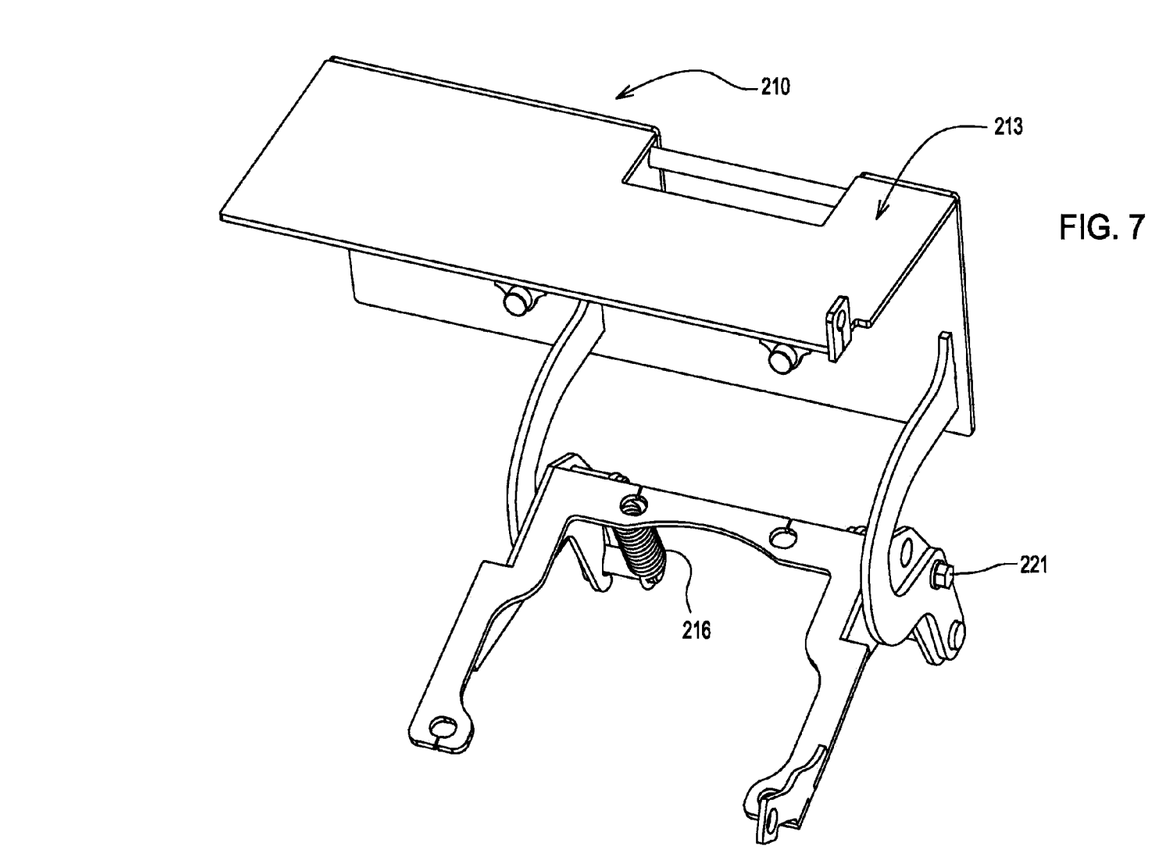
FIG. 7 illustrates the counterweight of FIG. 5 with a detailed view of the hinged door.

FIG. 5 illustrates an exemplary DEF and fuel fill assembly 300 which may include: the fuel tank 60, the DEF tank 400; a DEF tank filler tube 401; a counterweight 200 which includes a first portion 200a and a second portion 200b; and the fuel filler tube 61, the first portion 200a including threaded attachment holes 200a' for conventionally attaching the second portion 200b with matching attachment screws (not shown) to the first portion 200a and to the frame 40 (see FIGS. 2, 3 and 4). As illustrated in FIG. 6, the second portion may include a lower part 200b' and upper part which may be a plate 200b" conventionally attached to the lower part 200b via screws 202.

As illustrated in FIGS. 2, 3 and 4 a DEF tank communication area 201 is provided which may include a hole in the frame 40 and a recess 201a in the first portion 200a.

Figure 8:
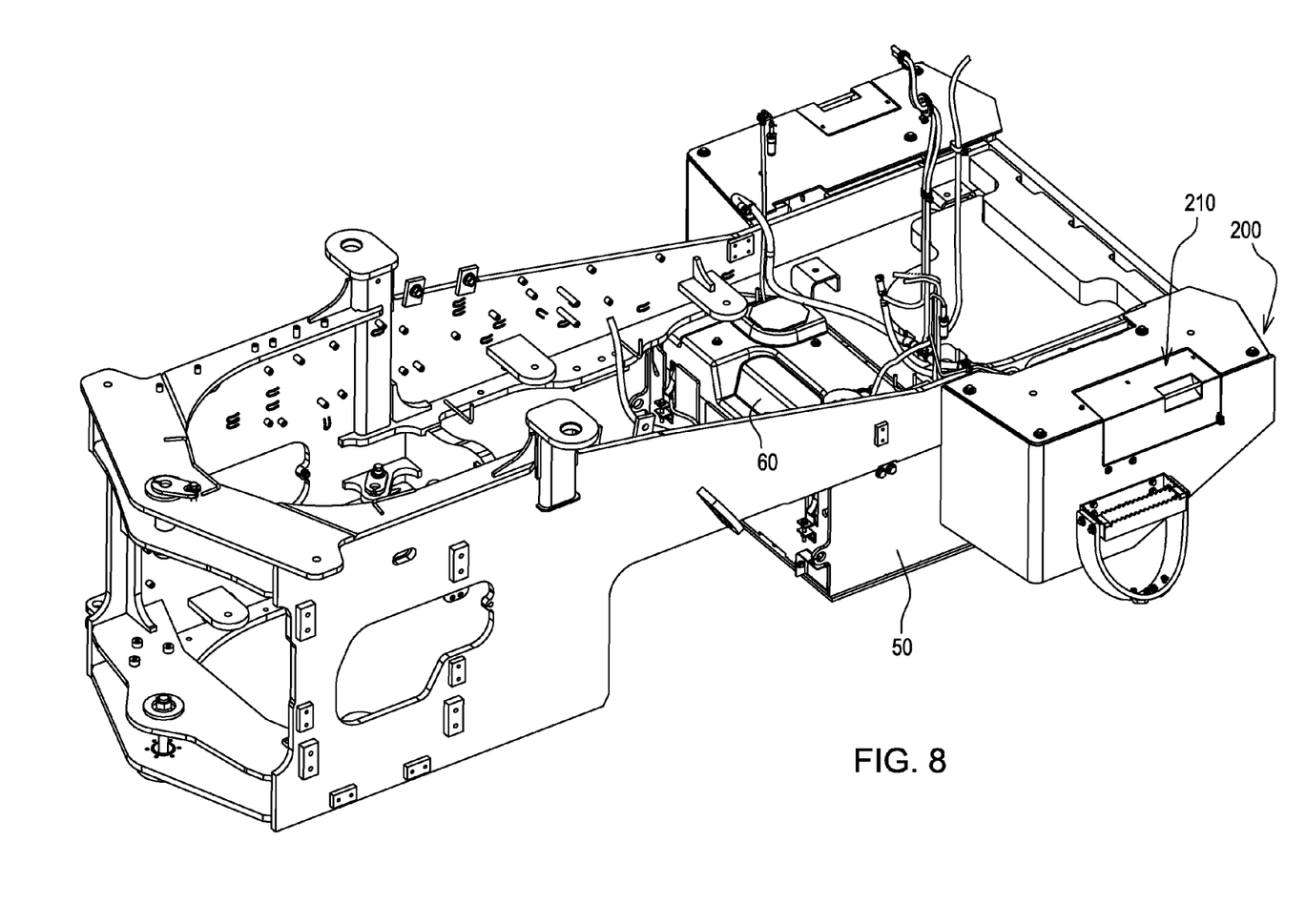
FIG. 8 illustrates a view of the frame of FIG. 2 with a completely assembled fuel and DEF tank system.
Figure 9:
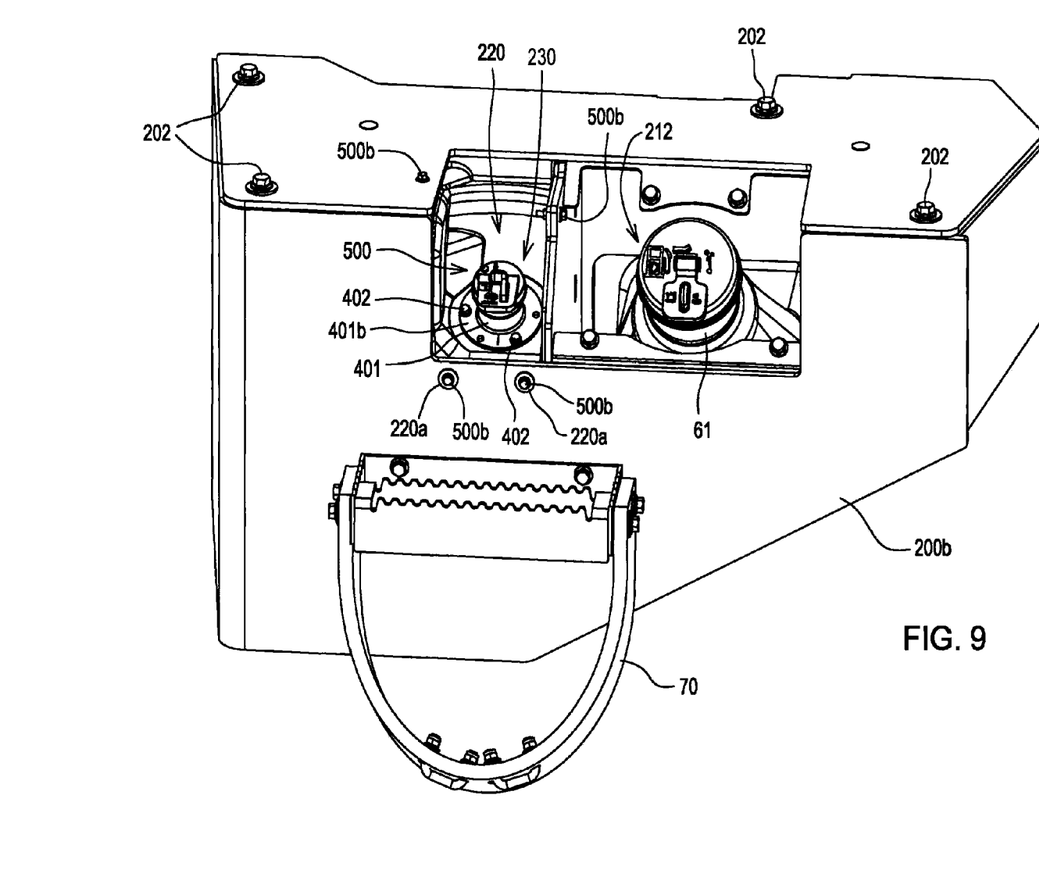
FIG. 9 illustrates a close-up view of the counterweight absent the hinged door.

As illustrated in FIGS. 6-10, the counterweight 200 may include: a plate-door mechanism 210 mechanically similar to the mechanism described and claimed in U.S. Pat. No. 6,938,928 having a spring loaded hinged door 213; a complementary DEF tank containment area 230 for the containment, support and protection of a DEF tank 400; and a complementary DEF tank fill open area 220 formed by spill guard 500 for the DEF tank filler tube 401. Conventionally welded to the counterweight 200 may be a separator wall 240 separating the fuel fill open area 212 from the DEF tank fill open area 220. As illustrated, edges 242 of the separator wall 240 may conform to a shape of the door 213 to give greater structural support to the door 213 when it is closed. As illustrated, a conventional step 70 may be attached below the door 213. The door 213 may cover and protect the fuel fill open area 212 and the DEF tank fill open area 220 as illustrated in FIG. 9. Thus the step 70 and the counterweight 200 may form a convenient stairway when the door 213 is in the closed position as illustrated in FIG. 8.

The DEF tank containment area 230 includes: a first wall 225, a second wall 226, a third wall 227; and a fourth wall 228 (see FIG. 6). The first, second and fourth walls, 225, 226, 228 may be welded or attached via some other conventional means as shown in FIG. 6. The third wall 227 is a portion of the counterweight plate 200b'' which is attached to the lower portion 200b' via the screws 202.

As indicated in U.S. Pat. No. 6,938,928, which is incorporated by reference, the plate-door mechanism 210 may be of the over center type in which the springs 216 may act to toggle the hinged door 213 about the door pivots 221 to the completely opened and completely closed positions with the highest spring force occurring at a transitional position between the completely opened and completely closed positions of the door 213. Thus, when completely closed, the door 213 may be biased toward the closed position and, when fully opened, the door 213 is biased toward the open position. As indicated in FIG. 6, the plate door mechanism 210 may be conventionally attached to the counterweight 200 via screws 210a.

Figure 10:
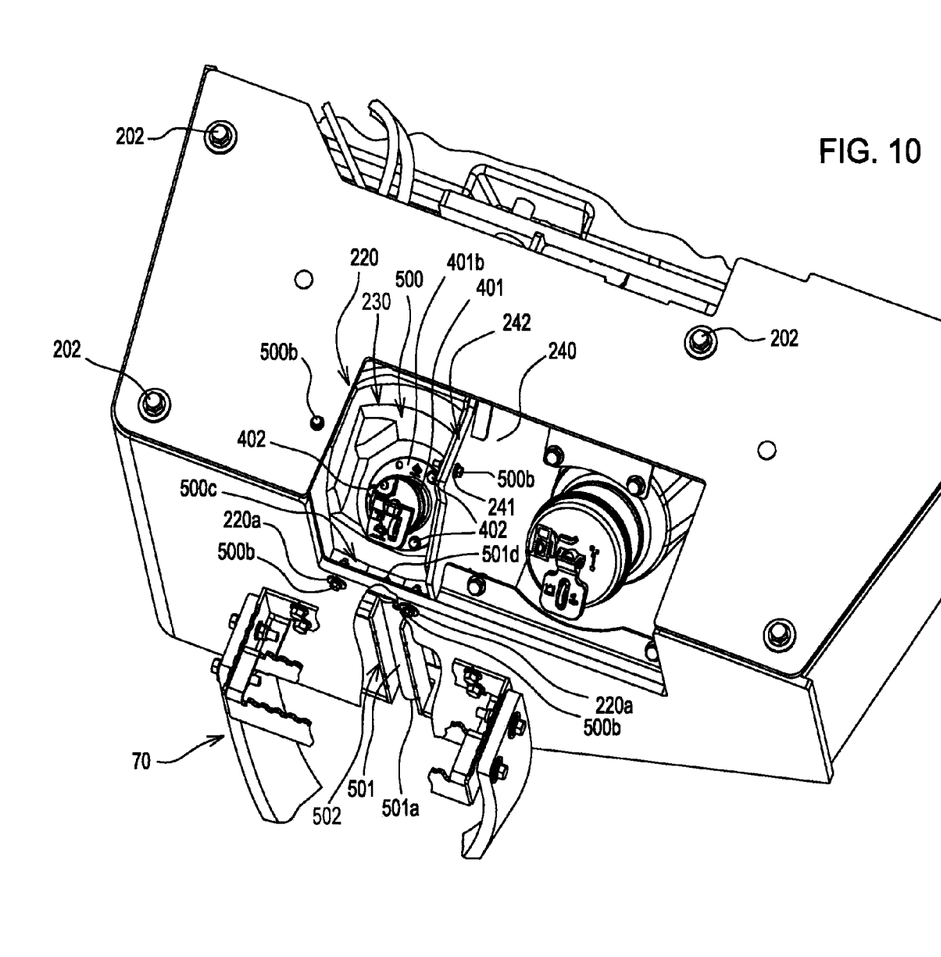
FIG. 10 illustrates another close-up view of the counterweight absent the hinged door.
Figure 12:
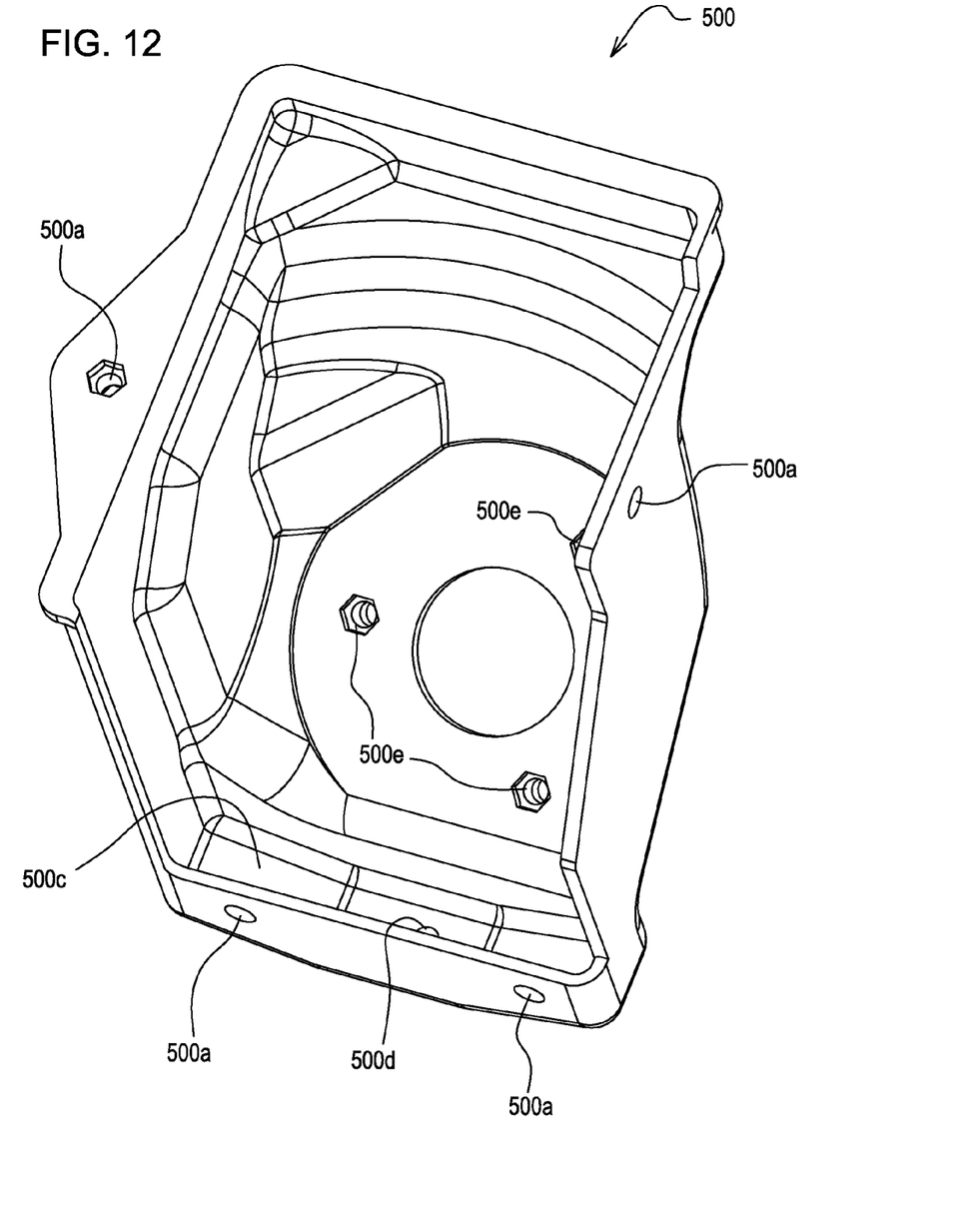
FIG. 12 illustrates an orthogonal view of the DEF spill guard.

As illustrated in FIGS. 6, 9 and 10, the spill guard 500 may be attached to the counterweight 200, via spill guard attachment holes 500a, counterweight attachment 30 holes 220a and screws 500b and may be made of a material which is corrosion resistant or non-corrosive after direct exposure DEF fluids such as, for example, aqueous urea. This material may be, inter alia, plastic or ceramic. The screws 500b may be made of a non-corrosive material such as, for example, stainless steel. As illustrated, the spill guard 500 may cover the entire DEF tank fill open area 220 and may also be attached to the separator wall 240 via one of the spill guard attachment holes 500a, a hole 241 in the separator wall 240, and a screw 500b. As illustrated in FIGS. 5, 10 and 12, toward the bottom of the DEF spill guard 500 may be an integrated DEF drain trough 500c and drain spout 501d. Attached to the drain spout 500d, via conventional means which may include a clamp (not shown), may be a drain hose 501 having an open end 501a located at or below the bottom of the counterweight 200. The drain hose 501 may be made of a non-corrosive material with respect to DEF fluids. A drain hose passage area 502 may be included in the counterweight 200 for the passage and protection of the drain hose 501. The drain hose passage area 502 may also be made of a non-corrosive material such as, for example, plastic.

Figure 11:
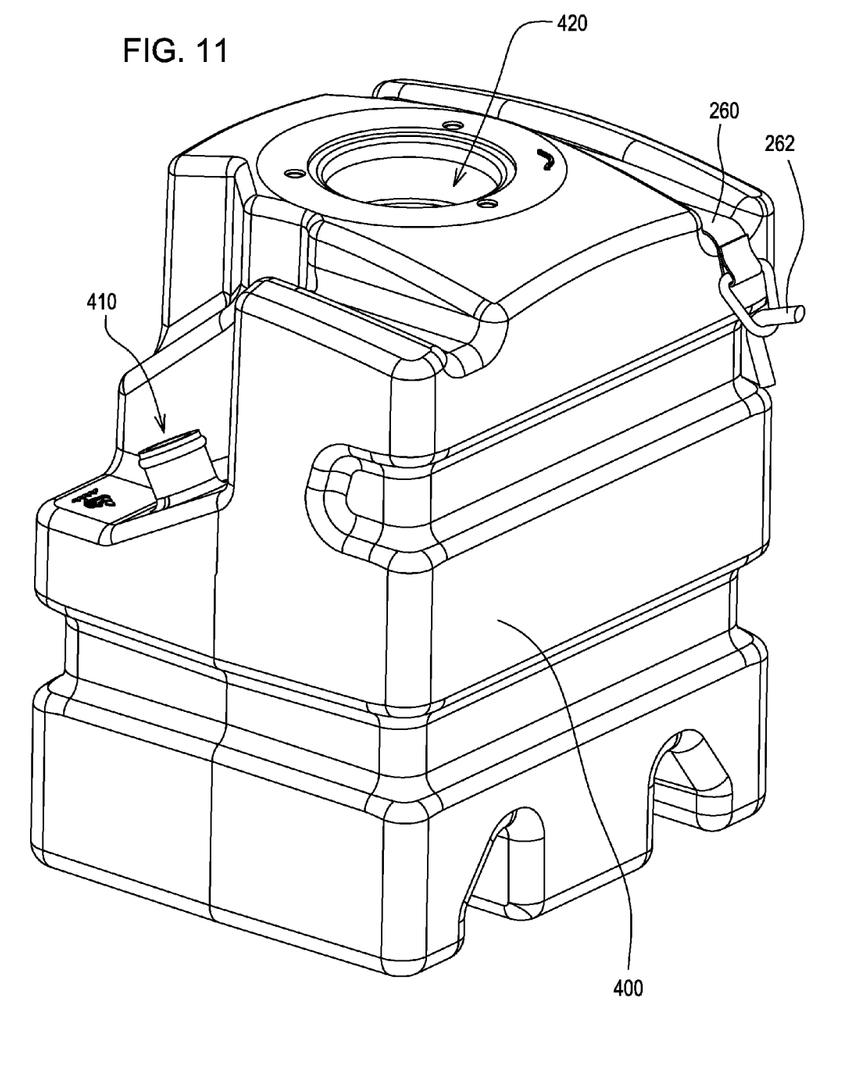
FIG. 11 illustrates an orthogonal view of the DEF tank.

As illustrated in FIGS. 6, 8 and 11, the DEF tank 400 may be secured to the counterweight 200 via a mounting strap 260 attached to a screw and bracket assembly (not shown) which may be conventionally attached to a first wall 225 of the counterweight 200 and a hook 262 which may be welded to a second wall 226 of the counterweight 200. A stop plate (not shown) may also be provided to resist sliding of the DEF tank 400 toward the hook 262.

As illustrated in FIG. 11, the DEF tank 400 may include a fill port 410 for attachment to the fill tube and a multi-purpose hole 420 which, when provided with a proper cover (not shown) provides a pathway for a DEF outlet tube (not shown), a DEF return tube (not shown), a breather (not shown) and a coaxial wiring harness (not shown) to carry signals from any sensors in the DEF tank 400. The DEF tank communication area 201 allows the passage of the return and outlet tubes, as well as the coaxial wiring harness to appropriate areas of the vehicle, i.e.: the passage of outlet tubes to DEF injectors where DEF is injected into engine exhaust gases; and the coaxial wiring harness to a controller (not shown).

FIG. 12 illustrates an orthogonal view of the spill guard 500 which may be used in this invention. Note that the attachment collar 401b is attached to the spill guard via collar attachment screws 402 and matching nuts (not shown) placed in holes 500e. While the material for the spill guard 500 in this exemplary embodiment may be entirely non-corrosive, a variant may be produced which involves corrosive materials which are coated with a non-corrosive material.

In practice, the DEF tank 400 and the fuel tank 60 may be designed such that comparative usage rates for DEF and fuel may result in similar or same fill times for both tanks, i.e., the DEF tank 400 may be designed such that it does not require refilling prior to a refilling of the fuel tank 60 or may even be design such that the DEF tank 400 and the fuel tank 60 require refills at similar or the same intervals. Thus, when an operator opens the door 213 to refill the fuel tank 60, he or she may also refill the DEF tank 400.

The DEF fluid and fuel fill system is described above as forming a part of a counterweight. However, DEF and fuel fill tubes may be proximally located under a door at other locations on the vehicle as long as the DEF tank is in proximity to a DEF fill area.

Having described the preferred embodiment, it will become apparent that various modifications can be made without departing from the scope of the invention as defined in the accompanying claims.

The invention claimed is:

1. A combined DEF and fuel fill assembly, comprising:
   a counterweight having a housing defining a DEF tank containment area and a fill area partitioned by a separator wall into a DEF fill area and a fuel fill area, the housing defining an opening at an upper region of the fill area for simultaneously accessing both the DEF fill area and the fuel fill area;
   a DEF tank housed in the DEF tank containment area of the counterweight;
   a DEF filler tube disposed within the DEF fill area and in communication with the DEF tank;
   a fuel filler tube disposed within the fuel fill area and in communication with a fuel tank;
   a spill guard disposed within the DEF fill area, the spill guard having a bottom and upright walls configured to couple to the housing and the separator wall to inhibit DEF from passing into the fuel fill area, the bottom having an opening through which the DEF filler tube extends such that the bottom of the spill guard is positioned below the fill end of the DEF filler tube and an upper edge of the separator wall; and
   an attachment collar disposed about the DEF filler tube and configured to couple the DEF filler tube to the spill guard,
   wherein the spill guard includes a drain for routing DEF away from the DEF fill area.

2. The combined DEF and fuel fill assembly of claim 1, wherein the bottom of the spill guard defines a drain trough and a drain spout communicating the drain with a drain hose.

3. The combined DEF and fuel fill assembly of claim 2, wherein the housing defines a passageway in which the drain hose is disposed.

4. The combined DEF and fuel fill assembly of claim 1, wherein the housing further includes a plate-door covering the fill opening, and wherein the plate-door is hinged to the housing and movable between opened and closed positions.

5. The combined DEF and fuel fill assembly of claim 4, wherein the upper edge of the separator wall contacts the plate-door when in the closed position.

6. The combined DEF and fuel fill assembly of claim 4, wherein the housing includes an over-center type hinge mechanism having at least one spring biasing the plate-door toward the open position when open and toward the closed position when closed.

7. The combined DEF and fuel fill assembly of claim 5, wherein in the closed position the plate-door is substantially flush with a top surface of the housing.

8. The combined DEF and fuel fill assembly of claim 1, wherein the counterweight further comprises a step attached to the housing.

9. The combined DEF and fuel fill assembly of claim 1, wherein one of the walls of the spill guard extends along the separator wall above the fill end of the DEF filler tube.

10. The combined DEF and fuel fill assembly of claim 1, wherein the opening is defined by a top wall and a front wall of the housing, and wherein the DEF and fuel filler tubes are accessible from a top and a front of the counterweight.

11. The combined DEF and fuel fill assembly of claim 1, wherein the spill guard is constructed of a material that is non-corrosive with respect to DEF.

12. A combined DEF and fuel fill assembly, comprising:
  a counterweight having a housing defining a DEF tank containment area and a fill area partitioned by a separator wall into a DEF fill area and a fuel fill area, the housing defining an opening at an upper region of the fill area for simultaneously accessing both the DEF fill area and the fuel fill area;
  a DEF tank housed in the DEF tank containment area of the counterweight;
  a DEF filler tube disposed within the DEF fill area and in communication with the DEF tank;
  a fuel filler tube disposed within the fuel fill area and in communication with a fuel tank;
  a spill guard disposed within the DEF fill area, the spill guard having a bottom and upright walls configured to couple to the housing and the separator wall to inhibit DEF from passing into the fuel fill area, the bottom having an opening through which the DEF filler tube extends such that the bottom of the spill guard is positioned below the fill end of the DEF filler tube and an upper edge of the separator wall; and
  wherein the bottom of the spill guard has a drain trough and a drain spout coupled to a drain hose for routing DEF away from the DEF fill area.

13. The combined DEF and fuel fill assembly of claim 12, wherein the housing defines a passageway in which the drain hose is disposed.

14. The combined DEF and fuel fill assembly of claim 12, further including an attachment collar disposed about the DEF filler tube and configured to couple the DEF filler tube to the spill guard.

15. The combined DEF and fuel fill assembly of claim 12, wherein the housing further includes a plate-door covering the fill opening, and wherein the plate-door is hinged to the housing and movable between opened and closed positions.

16. The combined DEF and fuel fill assembly of claim 12, wherein one of the walls of the spill guard extends along the separator wall above the fill end of the DEF filler tube.

17. A combined DEF and fuel fill assembly, comprising:
  a counterweight having a housing defining a DEF tank containment area and a fill area partitioned by a separator wall into a DEF fill area and a fuel fill area, the housing defining an opening at an upper region of the fill area for simultaneously accessing both the DEF fill area and the fuel fill area;
  a DEF tank housed in the DEF tank containment area of the counterweight;
  a DEF filler tube disposed within the DEF fill area and in communication with the DEF tank;
  a fuel filler tube disposed within the fuel fill area and in communication with a fuel tank;
  a spill guard disposed within the DEF fill area, the spill guard having a bottom and upright walls configured to couple to the housing and the separator wall to inhibit DEF from passing into the fuel fill area, the bottom having an opening through which the DEF filler tube extends such that the bottom of the spill guard is positioned below the fill end of the DEF filler tube and an upper edge of the separator wall;
  wherein one of the walls of the spill guard extends along the separator wall above the fill end of the DEF filler tube.

18. The combined DEF and fuel fill assembly of claim 17, further including an attachment collar disposed about the DEF filler tube and configured to couple the DEF filler tube to the spill guard.

19. The combined DEF and fuel fill assembly of claim 17, wherein the housing further includes a plate-door covering the fill opening, and wherein the plate-door is hinged to the housing and movable between opened and closed positions.

20. The combined DEF and fuel fill assembly of claim 19, wherein the bottom of the spill guard defines a drain trough and a drain spout communicating the drain with a drain hose, and wherein the housing defines a passageway in which the drain hose is disposed.

* * * * *